United States Patent [19]

Chikaraishi

[11] 4,413,444
[45] Nov. 8, 1983

[54] GUIDE RAIL FOR A SLIDING DOOR

[75] Inventor: Takayo Chikaraishi, Kawasaki, Japan

[73] Assignee: Nissan Motor Company, Limited, Kanagawa, Japan

[21] Appl. No.: 283,794

[22] Filed: Jul. 16, 1981

[30] Foreign Application Priority Data

Jul. 17, 1980 [JP] Japan ............................... 55-97743
Jul. 17, 1980 [JP] Japan ............................... 55-97744

[51] Int. Cl.³ .................. E05D 13/02; B60J 5/06
[52] U.S. Cl. ................................. 49/409; 296/155
[58] Field of Search ............ 49/409, 410, 411, 209, 49/213–224; 296/155

[56] References Cited

U.S. PATENT DOCUMENTS 2,876,504  3/1959  Bennett et al. .................... 49/218
3,983,600  10/1976  Smith .............................. 49/409 X
4,152,870  5/1979  Knap ............................... 49/409 X
4,152,872  5/1979  Tamzaki et al. .................... 49/214

*Primary Examiner*—Philip C. Kannan
*Attorney, Agent, or Firm*—Lowe, King, Price & Becker

[57] ABSTRACT

A guide rail for a sliding door on an automotive vehicle is located along, under and adjacent to the weather strip which surrounds a rear side window. The weather strip is integrally formed with a lip along its lower edge, in the longitudinal direction thereof so that the lip can seal the gap formed between the rear quarter panel of the vehicle and the guide rail. It is desirable to provide a thin plate covering over at least one outer wall of the guide rail after the painting process. The covering is made of a lustrous material such as stainless steel or a plastic which can be easily colored.

8 Claims, 10 Drawing Figures

FIG.1
PRIOR ART
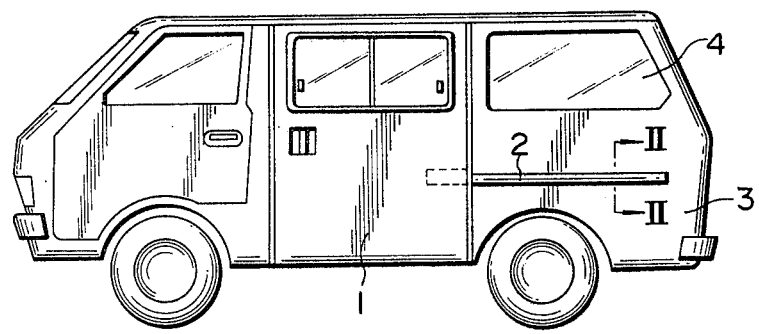
FIG.2(a)
PRIOR ART
FIG.2(b)
PRIOR ART
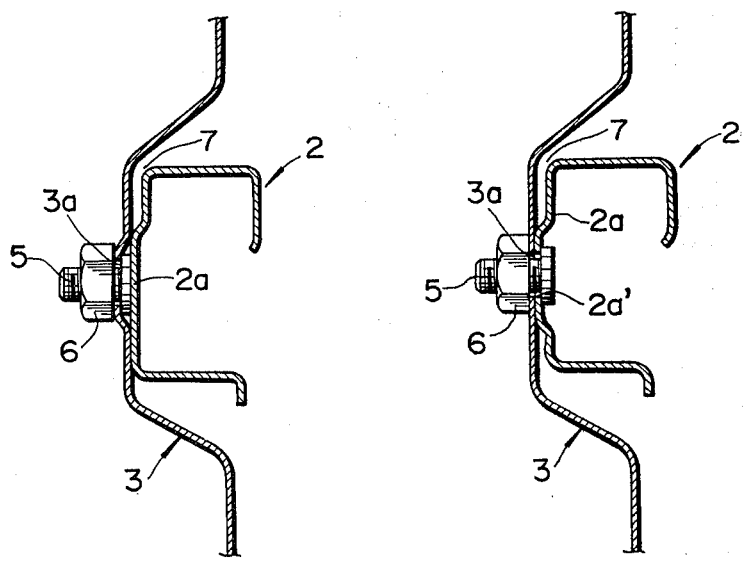

GUIDE RAIL FOR A SLIDING DOOR

BACKGROUND OF THE INVENTION

The present invention relates to the structure of a guide rail for a sliding door on an automotive vehicle, and more particularly to a sealing arrangement and an improvement in the appearance of the guide rail.

Conventionally, vehicles such as vans or minibuses are generally provided with at least one sliding door. The guide rail of such a sliding door is mounted on a rear quarter panel by means of welding, bolts, or a combination thereof. However, water easily enters the space between the guide rail and the rear quarter panel so that the welded or bolted parts are apt to rust. Thus, rusty water spreads onto the outer panel thereby spoiling its appearance. Further, if the rust continues to grow in the joints between the guide rail and the outer panel, this will possibly cause the guide rail to fall down.

The guide rail is generally made of a lustrous metal such as stainless steel so as to show a good appearance, for example, as one kind of mouldings. On the assembly line, however, the body painting process is conducted after mounting the guide rail onto the vehicle body. Therefore, in order to keep the lustre of the guide rail after the painting process, it is necessary to mask the guide rail when the vehicle body is subjected to the painting process. This requires the additional process of applying masking tape to the guide rail thereby increasing the cost and lowering the working efficiency.

SUMMARY OF THE INVENTION

It is therefore an object of the present invention to provide a guide rail for a sliding door that prevents water entering into the joints of the guide rail.

Another object of the invention is to provide a guide rail for a sliding door which can be mounted on a vehicle body with improving working efficiency.

A further object of the invention is to provide a guide rail for a sliding door with a good appearance.

According to the present invention, a guide rail frame is located just below the lower edge of the weather strip which surrounds a rear side window. The lower edge of the weather strip is integrally formed with a lip in the longitudinal direction thereof. The guide rail is arranged such that the gap between the guide rail and the rear quarter panel is sealed by the lip so that a waterproof sealing is easily performed. It is preferred to provide a thin plate covering onto at least the outer wall of the guide rail after the body painting process so that a good appearance of the guide rail can be obtained.

BRIEF DESCRIPTION OF THE DRAWINGS

Other objects, features and advantages of the present invention will be apparent from the following description, taken in conjunction with the accompanying drawings, which are given by way of example only, and are not intended to be limitative of the present invention. In the drawings:

FIG. 1 is a schematic side view of an automotive vehicle provided with a sliding door showing a conventional arrangement of the guide rail for the sliding door;

FIGS. 2(a) and (b) are sectional views taken along the line II—II in FIG. 1, showing the structure of the joints between the guide rail and the rear quarter panel in accordance with conventional methods;

FURTHER DESCRIPTION OF THE PRIOR ART

Figure 3A:
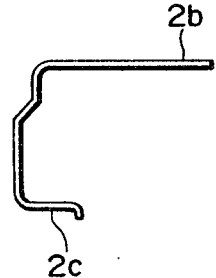
FIGS. 3(a), (b), (c) are schematic views showing a procedure for forming the guide rail in accordance with conventional methods.

To facilitate understanding of the present invention, a brief reference will be made to a prior art guide rail for a sliding door. Referring to FIG. 1, the reference numeral 1 denotes a sliding door which moves rearward along a guide rail 2. The guide rail 2 is mounted on a rear quarter panel 3 at some distance below a rear-side window 4. The guide rail 2 is generally secured by some well known manner in such a manner that the guide rail 2 is directly secured to the outer panel 3 by spot welding; or modifications of combinations of welding and bolting as shown in FIGS. 2(a) and (b). In FIG. 2(a), a plurality of bolts 5 are secured onto the outer surface of the inner side wall 2a of the guide rail 2 by projection welding or the like. The welded bolts 5 are inserted through holes 3a formed in the panel 3 so that the guide rail 2 can be secured to the panel 3 by nuts 6 provided on the inner surface of the panel 3. On the other hand, in FIG. 2(b), the side wall 2a of the guide rail 2 is formed with a plurality of through holes 2a' through which bolts 5 are inserted. After the bolts 5 are secured to the side wall 2a by welding therebetween, the bolts 5 are inserted through the holes 3a and all of them are secured in the same manner as in FIG. 2(a).

In the structure of the guide rail assembled as mentioned above, water readily enters into the space between the outer panel 3 and the guide rail 2 through the gap 7 so that the joints and their surroundings are apt to be corroded by water.

Figure 3B:
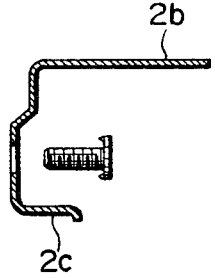
Figure 3C:
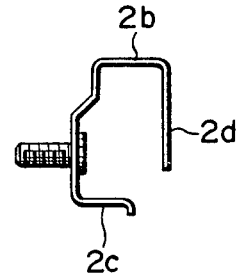

It is preferable to hide bolt heads, punched marks and the like in order to obtain a good appearance of the vehicle body. Therefore, the outer side wall is formed long enough to hide the bolt heads. However, the long outer side wall may interfere with welding the bolts and forming the through holes. Thus, in the prior art, a guide rail 2 having a long outer side wall cannot be formed by one step rolling so that the three steps shown in FIGS. 3(a) to (c) are required. First, as shown in FIG. 3(a), a top wall 2b and a bottom wall 2c are formed by rolling. Second, as shown in FIG. 3(b), through holes are formed and bolts are welded therein. Finally, as shown in FIG. 3(c), an outer side wall 2d is formed in a press. In addition to these steps, an application of masking tape is required as mentioned above thereby increasing the cost and lowering the working efficiency.

DETAILED DESCRIPTION OF THE EMBODIMENTS

Figure 4:
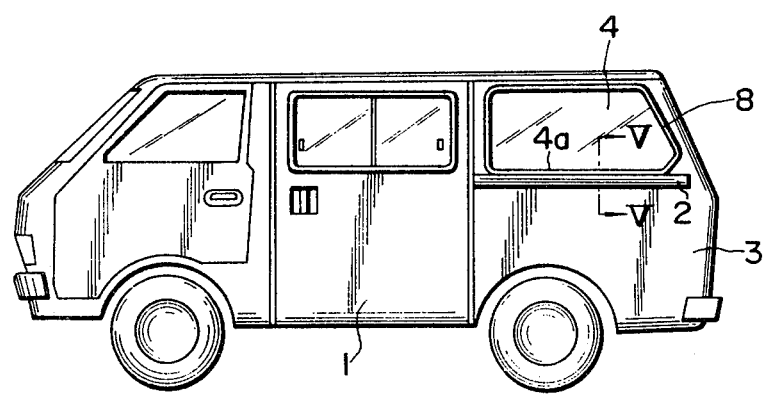
FIG. 4 is a schematic side view of an automotive vehicle showing an arrangement of the guide rail in accordance with the present invention.

Referring now to FIG. 4, there is shown a vehicle provided with a guide rail structure in accordance with a preferred first embodiment of the present invention. In the figure, the same reference numerals denote the same or corresponding parts or elements to those of FIGS. 1 to 3. Hence, the descriptions of those elements are not repeated. The reference numeral 8 denotes a piece of weather strip surrounding a rear-side window 4. In the preferred embodiment, a guide rail 2 is located along the lower edge 4a of the rear-side window 4.

Figure 5:
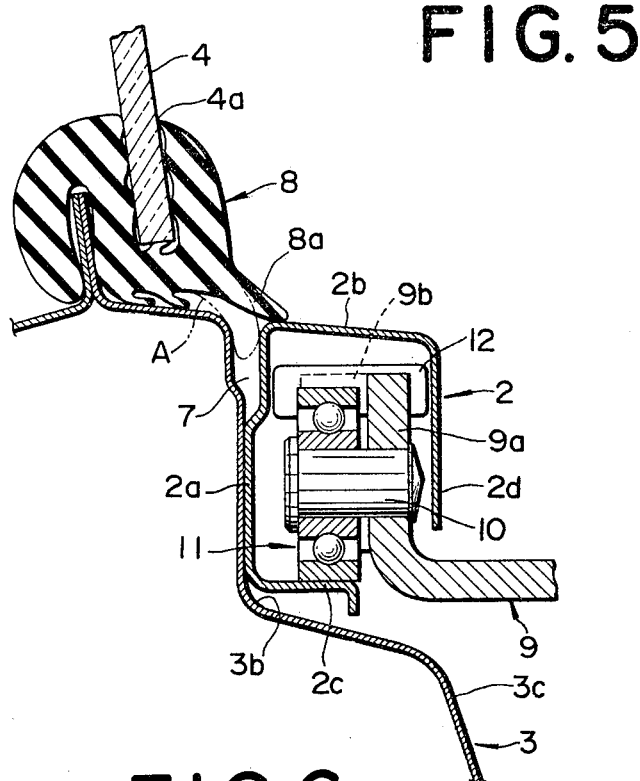
FIG. 5 is a sectional view taken along the line V—V in FIG. 4, showing a structure of a first preferred embodiment according to the present invention.

Referring to FIG. 5, there is shown a sectional view of the first preferred embodiment of the guide rail in accordance with the present invention, taken along the line V—V in FIG. 4. That is, the guide rail 2 is secured in a recessed segment 3b in the rear quarter panel 3 by means of spot-welding or the like so that the outer side wall 2d of the guide rail 2 is substantially at the same level as the side surface 3c of the panel 3.

The weather strip 8 is integrally formed with a lip 8a along the lower edge thereof, in the longitudinal direction of the weather strip 8. Thus, the end of the lip 8a touches the top wall 2b of the guide rail 2 so that the gap 7 formed between the rear quarter panel 3 and the guide rail 2 is covered. Owing to this lip 8a, water falling from the rear side window 4 flows over the lip 8a and the outer surface of the guide rail 2 so that the water cannot enter the gap 7. Consequently, the generation of rust at the joint between the panel 3 and the guide rail 2 is reduced.

In a similar way, the lip 8a may be inserted in the gap 7 as shown by the phantom line A in FIG. 5 so that the water cannot enter the gap 7 in the same manner as the above.

The sliding door 1 is moved rearward through a sliding means which is engaged within the guide rail constructed above. That is, the sliding means includes a bracket 9 which is rotatably provided in the sliding door 1, a roller axis 10 which is secured to a vertical part 9a of the bracket 9, and a roller member 11 which is rotatably mounted on the roller axis 10. Thus, the roller member 11 can rotate along the bottom wall 2c of the guide rail 2 so that the sliding door 1 can be supported while sliding by the sliding means.

Both side ends of the vertical part 9a of the bracket 9 are further bent in such manner that the bent end 9b projects in front of and behind the roller 11, respectively. The bent ends 9b are provided with a slider 12 substantially in a cylindrical shape so that the slider 12 can fit between the inner side wall 2a and outer side wall 2d of the guide rail 2 thereby keeping the sliding means steady.

Now, we move on to the second preferred embodiment of the present invention, which will be described hereafter with reference to FIGS. 6 to 7. In the description given hereafter similar parts or elements to those of FIG. 5 are represented by the same reference numerals to avoid unnecessary confusion.

Figure 6:
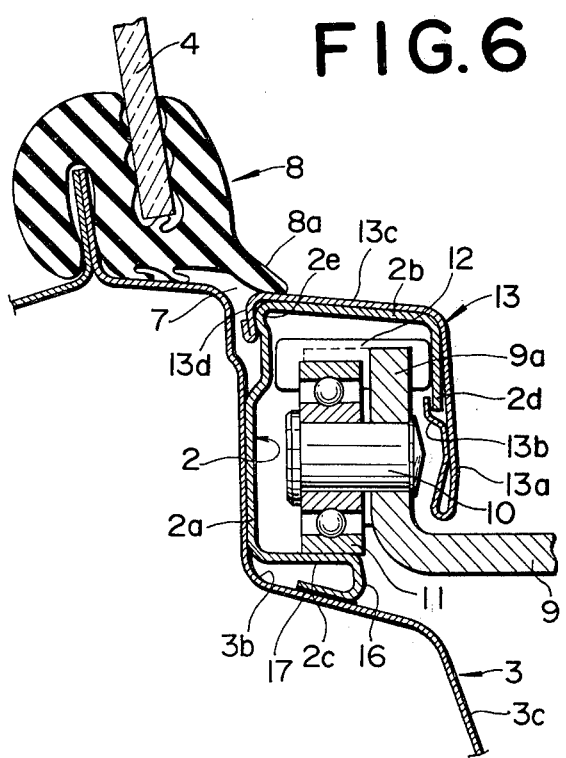
FIG. 6 is a sectional view showing a second preferred embodiment in which a thin plate covering is mounted on the guide rail.
Figure 7:
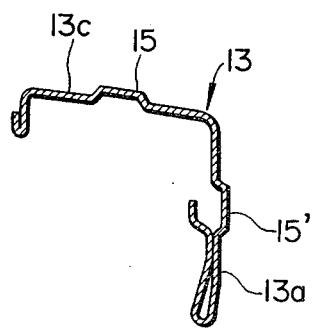
FIG. 7 is a sectional view showing another example of a thin plate covering in the embodiment of FIG. 6.

Referring to FIG. 6, there is shown a sectional view of the second preferred embodiment of guide rail in accordance with the invention. The guide rail 2 is secured in the recessed segment 3b under the weather strip 8 in the same manner as the first embodiment. The guide rail 2 is further provided with a thin plated covering 13 having a substantially L-shaped section which covers the top wall 2b and outer side wall 2d of the guide rail 2. The covering 13 comprises an apron 13a covering the outer side wall 2d, an engagement 13b formed by folding the lower part of the apron 13a to the inside so as to engage with the end of the outer side wall 2d, a top cover 13c covering the top wall 2b and a holder 13d bent a little inside so as to fit on a protrusion 2e on the guide rail 2. Thus, the covering 13 can be securely mounted on the guide rail 2 after the painting process. The apron 13a is designed to be long enough to hide the inside of the guide rail 2.

In order to improve the appearance, the covering 13 is made of a material such as a lustrous stainless steel or a plastic which can be easily colored. Further, various decorative coverings, such as that shown in FIG. 7, can be employed. In the figure, steps 15 and 15' are formed in the top cover 13c and apron 13a, respectively.

The weather strip 8 is integrally formed with a lip 8a in the same manner as in the first preferred embodiment. The lip 8a touches the top cover 13c of the covering 13 so that the gap 7 between the guide rail 2 and the panel 3 can be sealed thereby preventing water from entering the gap 7.

Further, in the second preferred embodiment, the guide rail 2 is formed with a support 16 formed by bending back the end of the bottom wall 2c. The support 16 is secured into the recessed segment 3b by a sheet spacer 17 made of resin so that the support 16 can take a part of the weight applied to the guide rail 2 by the sliding door 1.

The sliding means of the sliding door 1 is set in the guide rail 2 as constructed above in the same manner as in the first embodiment.

As can be seen from the foregoing, according to the present invention the guide rail can prevent water from entering into the space between the rear quarter panel and the guide rail so that the joints will not be readily rusted. Further, the guide rail may be covered with a covering after the painting process so that an application of masking tape will not be necessary thereby decreasing the manufacturing time and cost. In order to further improve the appearance, the covering could be produced with various decorative figures and various colors by using an appropriate plastic.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A guide rail structure for a sliding door on an automotive vehicle comprising a sliding means for supporting the sliding door; and a guide rail in which the sliding means is moved, secured onto a rear quarter panel of the vehicle body;

the improvement comprising:

said guide rail located under, along and adjacent to the weather strip surrounding a rear side window; and a lip integrally formed along the lower edge of the weather strip, arranged such that said lip seals the gap between the rear quarter panel and said guide rail.

2. A guide rail structure according to claim 1, wherein said guide rail is located in a recess which is formed in the rear quarter panel, adjacent to the lower edge of the weather strip.

3. A guide rail structure according to claim 1 or 2, wherein said lip is sealingly inserted into the gap between the rear quarter panel and the guide rail.

4. A guide rail structure for a sliding door on an automotive vehicle comprising a sliding means for supporting the sliding door; and a guide rail in which the sliding means is moved, secured onto a rear quarter panel of the vehicle body;

the improvement comprising:

said guide rail located under, along and adjacent to the weather strip surrounding a rear side window;

a covering for covering at least the outer wall of said guide rail; and a lip integrally formed along the lower edge of the weather strip, arranged such that the lip seals the gap between the rear quarter panel and said guide rail.

5. A guide rail structure according to claim 4, wherein said covering is a substantially L-sectioned thin plate made of a stainless steel or a plastic.

6. A guide rail structure according to claim 4 or 5, wherein said covering comprises an apron having a folded edge for engaging with one edge of the outer wall of said guide rail, and a top cover having an edge for holding a protrusion of said guide rail thereby making mounting said covering onto said guide rail after a painting process easy.

7. A guide rail structure according to claim 6, wherein said covering is formed with steps.

8. A guide rail structure according to any one of claims 1, 2, 4 and 5, wherein said guide rail is integrally formed with a support along its bottom wall, said supports resting on the quarter panel over a sheet spacer so as to take a part of the weight applied to said guide rail by the sliding door.

* * * * *